March 6, 1956  W. H. BENDALL  2,737,033
RESILIENT GEAR COUPLINGS
Filed April 9, 1951  3 Sheets-Sheet 1

INVENTOR.
Wilfrid H Bendall

March 6, 1956 W. H. BENDALL 2,737,033
RESILIENT GEAR COUPLINGS
Filed April 9, 1951 3 Sheets-Sheet 2

INVENTOR.
Wilfrid H Bendall

INVENTOR.
Wilfrid H Bendall

United States Patent Office 2,737,033
Patented Mar. 6, 1956

2,737,033

RESILIENT GEAR COUPLINGS

Wilfrid H. Bendall, New York, N. Y.

Application April 9, 1951, Serial No. 219,986

5 Claims. (Cl. 64—14)

This application is a continuation-in-part with respect to my copending application Serial No. 595,388, filed May 23, 1954, now Patent Number 2,562,166, dated July 31, 1951, and relates back as to all common subject matter for all dates and rights incident to the filing of said application.

The present invention relates to mechanical power transmission shaft coupling devices and has particular reference to further adaptations of the resilient element of the above identified parent application for interconnecting gear-toothed shaft couplings and hub mounted drive components.

Efficient articulated interconnection of the drive shafts of prime movers and machines is a basic power transmission requirement. Drives of increasing complexity, speed and power range demand coupling means capable of dealing with extreme fluctuations of angular velocity and torque, torsional and longitudinal vibration, and compound shaft misalignment—a combination of performance requirements not generally within the province of a single design principle. Hence, coupling constructions of the prior art, ostensibly designed to cope with these difficult requirements, are invariably found to embody a particular structural or operating feature which functions satisfactorily only at the expense of other features, and thus offer performance characteristics of limited scope. This may be taken as an index of the difficulty of arriving at a broadly acceptable design solution and undoubtedly accounts for the great diversity of coupling constructions in use at the present time. A certain economic loss is implicit in this situation since coupling limitations limit machine performance and sometimes impose costly design and performance modifications on an otherwise well integrated machine installation.

It is a matter of elementary observation that the ideal articulated coupling should be of simple design and consist of the smallest possible number of easily produced parts. It is also apparent that for a given angle of twist or misalignment the relative motion to be accommodated at the coupling working radius, between separately aligned shaft members, increases directly with the radial distance from the shaft center-lines or geometrical intersection points. The smallest effective working diameter permitted by the controlling drive shaft and hub dimensions and the shortest corresponding axial length necessary to transmit a given operating torque, therefore, are guiding coupling design parameters. These considerations and the essential requirement of mechanically efficient shaft and hub coupling means, point inevitably to the integral involute spline element as a structural ideal for this purpose and, as is well known, couplings relying on the kinematic play of loosely meshed concentric internal and external gear teeth are in wide use. As commonly used, however, the limitations of this admirably simple and effective mechanism are a negligible torsional resilience and a misalignment accommodation confined to the permissible corner loading of two pairs of rigid gear teeth. It is thus not capable, in its familiar form, of coping with anything like the broad range of coupling duties noted above. But it will be plain that any method of adapting its principle for the present purpose, while retaining its established virtues of simplicity and reliability, would greatly enchance its technical and economic status as a machine connector and would constitute a new and particularly useful contribution to the art. This is the major object of the present invention.

Correlated additional objects and advantages of this invention will appear following perusal of the accompanying specification and reference to the drawings, in which Figure 1 is a partly diagrammatic fragmentary end view of the corrugated resilient element of this invention interconnecting toothed gears.

Figure 1:
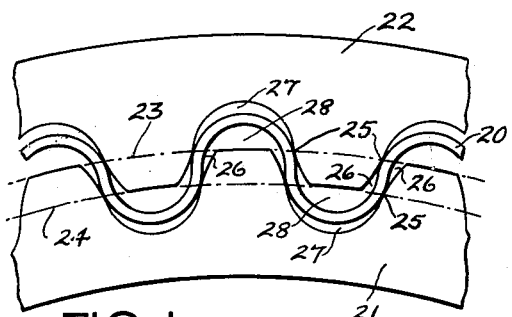

Referring more particularly to the drawings, Fig. 1 diagrammatically illustrates a simple form of this invention, applicable to gear couplings and to hub mounted drive components. In this illustration reference numeral 20 designates a typical resilient drive element meshing with the radially spaced teeth of concentric externally toothed gear 21 and internally toothed gear 22. The resilient element comprises sinusoidally corrugated resilient material of any suitable analysis, with the pitch and form of the corrugations shaped to provide alternating, substantially externally tangential engagement contact with the sides of the teeth of both gears at spaced points and to provide operating clearance therewith at all other points.

The corrugations and the gear teeth may have any practical contour that meets these requirements. Considerations of design strength and manufacturing convenience suggest that the gear teeth approximate the approved involute form and that the corrugations comprise a series of symmetrical arcuate portions. The concentric gear members are spaced radially apart a sufficient distance to engage the corrugated resilient member substantially at contact pitch circles 23 and 24, such radial spacing itself being largely determined by acceptable corrugation elastic stresses and proportions for interconnecting gear teeth of substantially equal elastic strength and circumferential load capacity.

It will be seen that this arrangement provides axially disposed externally tangential working contact points or lines at 25 for each gear tooth, with diverging tooth face clearance spaces 26 radially above and below the contact line. Additional working clearance for corrugation flexure under load is provided by tooth root clearance spaces 27 and tooth top land clearance spaces 28. Thus assembled the corrugated resilient element itself constitutes a separately alignable, combined internal and external resilient annular gear member, interconnecting concentric rigid toothed gears. Driving torque applied to either rigid gear member is transmitted through the corrugation and gear tooth contacts and utilizes elastic deflection of the corrugations, proportional to their designed load capacity and working clearances, to transmit the torque and absorb load fluctuations and shocks. Since the entire length of each corrugation is free to participate elastically in this action the corrugated member functions as a continuous resilient beam.

Figure 2:
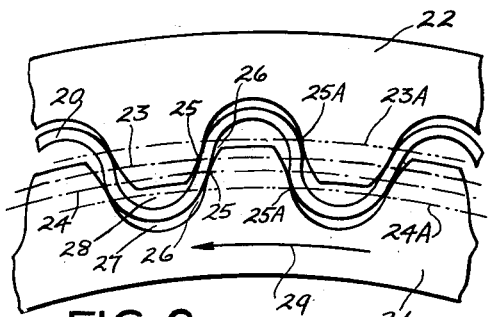
Figure 2 is a similar diagrammatic view illustrating the position of the parts shown in Fig. 1 when transmitting a driving torque in the direction of the arrow.

This will be further apparent on reference to Fig. 2 which shows the externally toothed inner gear member 21 transmitting a momentarily heavy driving torque in the direction of the arrow 29. By comparison with the position of these parts in the preceding illustration it will be observed that the tangential working contact of the resilient element with the gear teeth has resulted in combined rolling and flexural action, and considerably increased contact areas, at those points. The load contact areas and pitch circles, 23 and 24, have also approached each other on the directly loaded sides of the gear teeth while moving slightly apart on the opposite sides, as indicated by the opposite side contact pitch circles 23A and 24A, with tooth contact lines at 25A. Contact at these latter lines supports the beam reactions of the directly loaded portions of the resilient element and prevents objectionable backlash.

A number of other favorable drive characteristics are conveyed by this arrangement. Maximum use is made of a given volume of elastic material; space efficiency therefore is high. Approach of the external and internal tooth contact circles with increase in load increases resistance to shock and conveys the useful feature of a non-linear relationship between torque and deflection of the element. The element may be loaded practically to its elastic limit in bending without risk of failure, since maximum deflection merely puts it under compression between the rigid gear teeth. Preloading of the resilient element can be readily accomplished by making the pitch of the corrugations slightly greater than the pitch of the gear teeth and circumferentially crowding the element into the specified tangential contact with the gears. A particularly noteworthy additional advantage is that the overlapping gear tooth addenda can be relied upon for continued operation over a considerable period of time in the event of fracture of the resilient element at any point. This is an important consideration where sudden disconnection of coupling members might result in destructive acceleration of costly apparatus or interruption of a critical manufacturing process.

Figure 3:
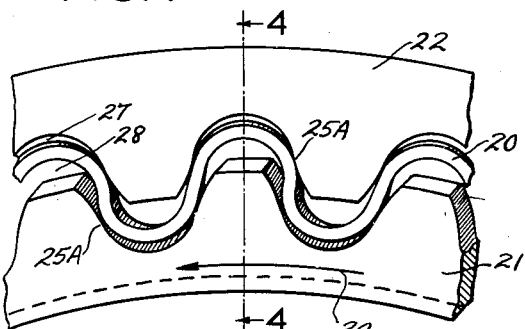
Figure 3 is another diagrammatic view of the parts illustrated in Figs. 1 and 2 accommodating both torque and misalignment.
Figure 4:
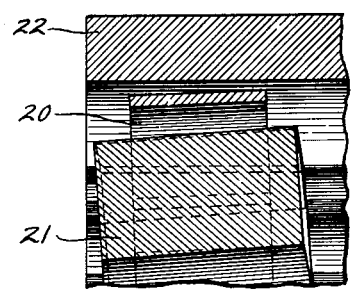
Figure 4 is a fragmentary section on the line 4—4 of Fig. 3.

It will be apparent that the resilient element, by virtue of its corrugated structure and purely elastic restraint between the radially spaced tooth contacts, can accommodate misalignment of the coacting rigid drive members through combined twisting and bending of the individual corrugations while under load. Such misalignment accommodation is diagrammatically illustrated in Figs. 3 and 4. It is to be understood that these figures provide a somewhat exaggerated view of this misalignment accommodation in order to illustrate the operating principle. Since the element, in effect, is free-floating and self-aligning, it tends to assume a mean angular position midway between the extreme misaligned positions of the coacting drive members. This is particularly illustrated in Fig. 4 where the element 20, is shown substantially halving the total misalignment angle and relative angular velocity of the rigid toothed gears 22 and 21. The tooth contact lines are correspondingly skewed and the corrugation portions between the successive contact lines at 25A will be twisted, as shown in Fig. 3. The amount of misalignment that can be accommodated in this manner is largely determined by the corrugation proportions and loading. For ordinary coupling and drive hub requirements the misalignment to be accommodated usually is relatively small, though nonetheless real, the essential drive requirement being for a connection that will effectively maintain continuous resilient circumferential drive contact under such misalignment.

Figure 5:
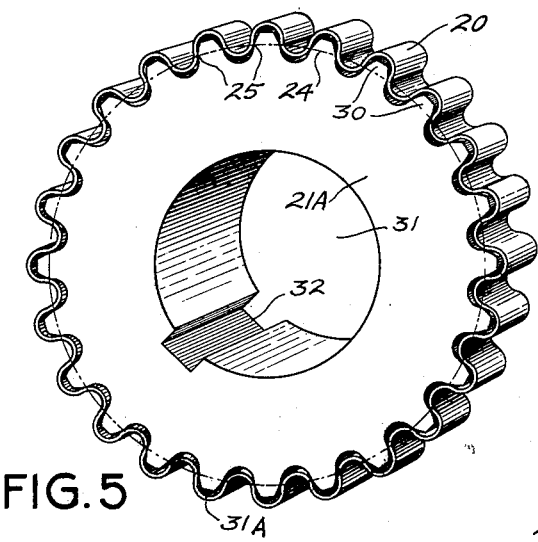
Figure 5 is a perspective view, on a smaller scale, of a drive component embodying the resilient element of this invention.

Fig. 5 discloses a typical resilient drive gear assembly embodying the foregoing structural features of this invention. This figure shows toothed spur gear 21A provided with rigid, integral teeth 30, and a central drive shaft aperture 31 with keyway slot 32. The resilient drive means, comprising element 20, encircles and meshes with the gear teeth at axially disposed tangential contact lines initially coinciding with contact pitch circle 24. It conveniently comprises a single corrugated length of any suitable material, such as hardened and tempered spring steel, with the ends cut square and butted at 31A, as shown. While this member is illustrated as preformed to the gear periphery it may also be initially formed and tempered in a straight corrugated length and bent to the required curvature on installation. In the example shown, however, it conveniently constitutes, in effect, a coiled spring member in resiliently sprung attachment and partial self-retention on the periphery of the gear. Positive axial retention thereon may be effected by means of snap rings in circumferential grooves in a coacting internally toothed member. Alternatively the gear teeth 30 may be extended axially to provide sufficient length at each side of the element for such retaining means. Resilient gear assemblies of this kind can be used as drive hubs of shaft couplings, chain sprockets, pulleys and related power transmission components. With suitable circumferential retaining means for securing the resilient element they can also be used as externally tangential gear drive members and as resilient chain drive sprockets, the corrugation shape being modified as required, to accommodate chain link engagement.

Figure 6:
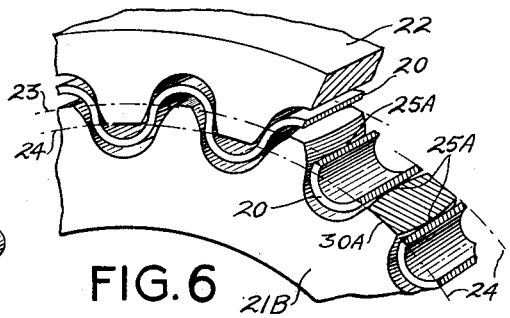
Figure 6 is a fragmentary perspective view, on a larger scale, of the resilient drive element of this invention engaging gear teeth modified to provide elliptical drive contact lines.

As noted in the introductory remarks to this specification, the power transmission capacity of misaligned rigid-toothed gears is limited by the resulting objectionable end or corner loading of the gear teeth. It has been shown above that the corrugated resilient element of this invention is inherently adapted to accommodate misalignment of such members and eliminate corner loading through its elastic twist between the gear teeth. With an element of given corrugation proportions and appreciable width, however, there naturally will also be a practical limit to the permissible elastic deflection. Where still greater misalignment accommodation is required, therefore, it can be accomplished by modification of the gear tooth shape to provide elliptical working contact lines with the corrugations. This modification is illustrated in Fig. 6 where the gear 21B is provided with such teeth. One such tooth, designated 30A, is sectioned at pitch contact circle 24 to show its elliptical axial section and the resulting elliptical working contact lines 25A with the corrugations of the resilient element 20. Maximum misalignment accommodation on this principle may be achieved by providing both rigid-toothed gear members 21B and 22, with teeth of this elliptical section.

Figure 7:
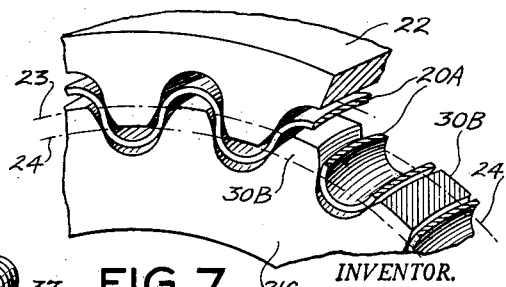
Figure 7 is a similar fragmentary perspective view illustrating a further modification comprising a resilient drive element provided with spherical corrugations engaging an internally toothed and an externally spherical toothed gear.

A further advantageous structural modification of the coacting gears and resilient elements of this invention, to accommodate increased relative motion and misalignment at the working contact pitch lines, is disclosed in Fig. 7. In this figure the corrugations of the resilient element, as shown by the sectioned portions designated 20A, are given an axially arcuate or spherical form concentric with axially disposed spherical gear teeth 30B of the gear 21C. The element formed in this manner conveniently comprises a spherical annular member with a center of oscillation substantially at the shaft axis of the coacting members. This arrangement conveys the further advantage of relatively positive axial retention of the element at the gear peripheries without restricting its resilient drive and alignment functions.

Figure 8:
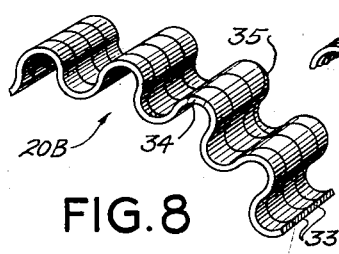
Figure 8 is a fragmentary perspective view of a modified structural form of the resilient drive element of this invention.
Figure 9:
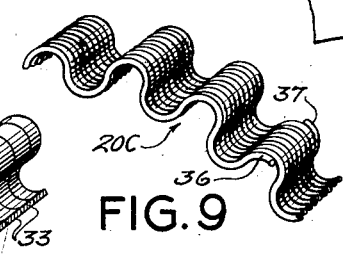
Figure 9 is a similar view of another structural modification of the resilient drive element.

Figs. 8 and 9 illustrate modified structural forms of the resilient drive element of this invention. In the modification shown in Fig. 8 the element, designated 20B, is fabricated from a helically wound length of suitable material of relatively narrow rectangular cross-section 33. Such material may evidently be coiled to any desired axial length and diameter to provide this element. The corrugations may be formed either before or after coiling, as determined by material and manufacturing considerations and the coil is preferably finished by being cut squarely across, as indicated at 34 and 35 in Fig. 8, to provide an element of uniform axial length.

While the material from which helically coiled elements of the foregoing type are constructed is indicated as of rectangular cross-section, other advantageous cross-sections such as square or elliptical may be used. Round wire with high physical properties, is a widely available and particularly suitable material for this purpose. Fig. 9 illustrates a resilient element, designated 20C, formed from helically coiled, corrugated round wire. As described for the preceding construction, the wire can be coiled to any required axial length and diameter and may be preset in coiling, if desired, to retain the coil form. In this form of element the cut ends 36 and 37, of the coil, need not be squared. Coacting gear teeth of shorter axial length than a given coiled wire element of the type described, preferably are provided with rounded and bevelled ends to permit riding over the individual coils without snagging. Alternatively the individual corrugated turns of the coil may be canted axially for the same purpose. Oppositely canted wire coils may be superimposed. Helically coiled resilient drive elements constructed as described, present the advantages of relatively simple manufacturing requirements and high adaptability. It will also be apparent that they embody a considerably increased degree of elastic accommodation for the purposes of this invention, over resilient elements of the type described earlier.

Figure 10:
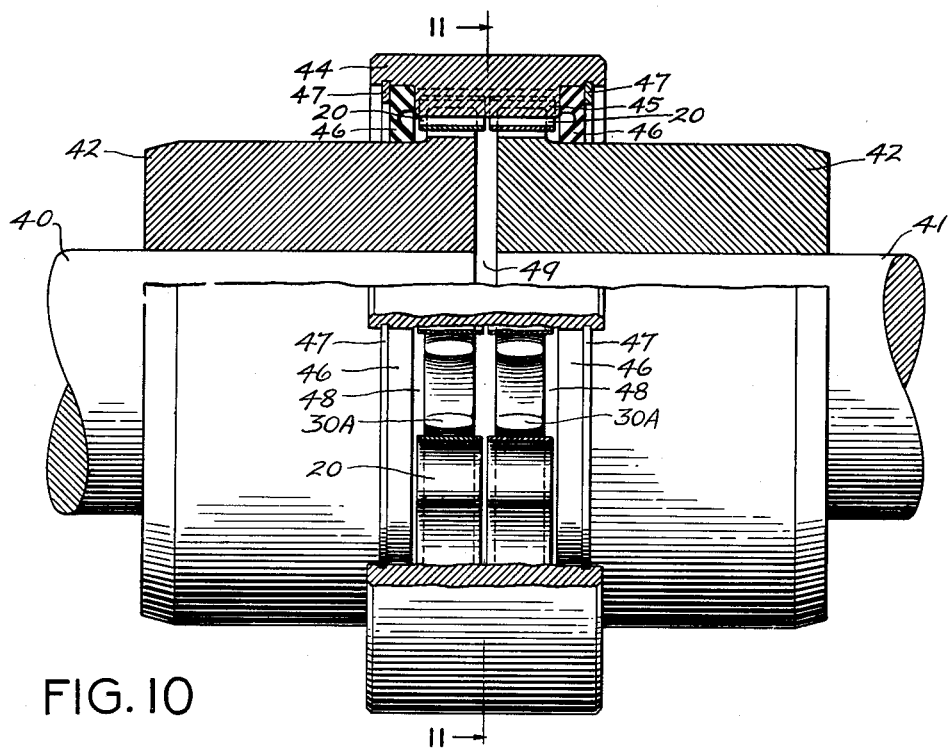
Figure 10 is a partly sectioned side elevational view of a resilient shaft coupling embodying this invention, with parts broken away to show the construction.
Figure 11:
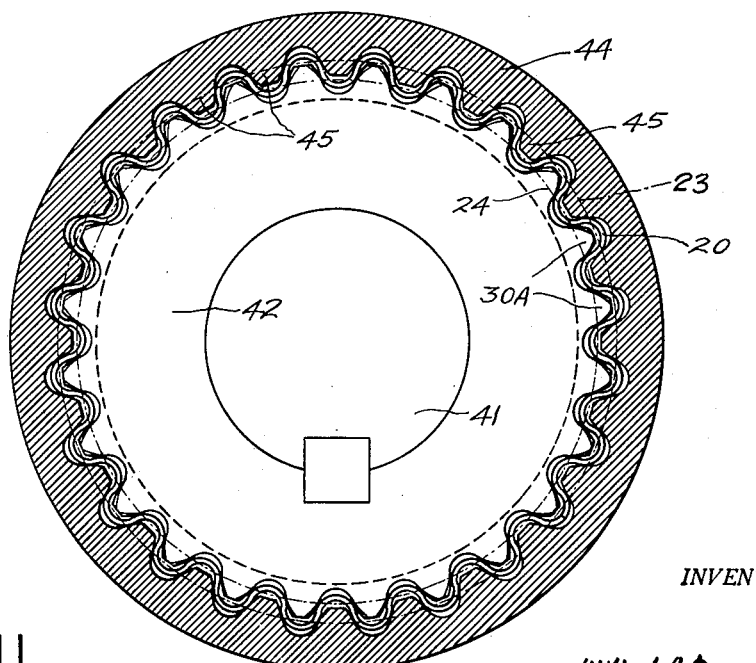
Figure 11 is a transverse sectional view on the line 11—11 of Fig. 10.

Figs. 10 and 11 disclose a resilient shaft coupling embodying the novel structural features of this invention. Reference numerals 40 and 41 designate two shafts arranged in axially spaced end to end relationship. Each shaft end has keyed thereto an identical coupling hub member 42, provided with circumferential gear teeth 30A. The latter preferably are of elliptical form, of the type disclosed in Fig. 6. Resilient drive means comprising the corrugated element 20 encircle and mesh with the sides of the gear teeth on each hub member at circumferentially spaced contact points initially coinciding with the inner contact pitch circle 24.

Interconnecting these two drive hub members is an outer annular sleeve member 44, provided with internal gear teeth 45 and extending between and over the hub tooth portions. The sides of the internal teeth of this member also engage the corrugated resilient elements at circumferentially spaced tangential contact points or lines initially coinciding with the outer contact pitch circle 23. Annular sealing members 46, retained by snap rings 47 inserted in circumferential internal grooves at each end of the outer member, seal the annular gap between this member and the adjacent hub surface. These sealing members exclude dirt and retain lubricant in the internal operating clearance spaces. They also coact with the snap rings to resiliently retain the outer member within the coupling axial float limits permitted by circumferential internal clearances 48 between the sealing members and the hub teeth, and transverse clearance gap 49, between adjacent ends of the hub members.

It will be observed that the individual parts combined to produce the foregoing coupling construction are substantially identical in form and operating function with those of the members disclosed in Figs. 1 to 7, inclusive, and described in the preceding parts of this specification. Combining these parts in this way permits effective division of the coupling function into double concatenating planes, each comprising three parts, i. e., the external and internal gear tooth portions each interconnected by resilient elements. This arrangement provides large coupling accommodation with minimum relative motion and internal friction, in a compact, mechanically simple and operationally safe structure. Disconnection, initial alignment and periodical inspection of couplings of this construction are readily accomplished by removing a snap ring and sealing member at either end of the outer member and sliding the latter axially over one of the hub members.

Since the required range of resilient coupling performance is often greater than can be economically handled within coupling proportions suitable for general industrial purposes, it is desirable that the basic design be capable of simple structural modifications to permit this. This is a valuable feature of the present invention and specific examples of simple modifications for this purpose are disclosed in Figs. 12 to 14, inclusive.

Figure 12:
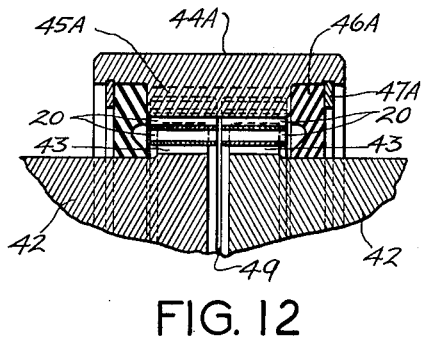
Figure 12 is a fragmentary sectional view of parts of a similar resilient coupling modified to use superimposed resilient elements.
Figure 13:
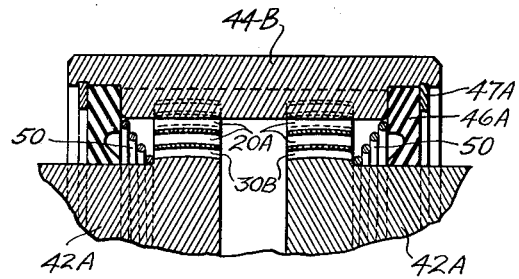
Figure 13 is a similar fragmentary sectional view of a further modification of the coupling.

If considerably greater torsional resilience, for example, is required in a coupling of the general type of the foregoing disclosure in Figs. 10 and 11, it can be obtained by providing superimposed resilient elements in each coupling half. This modification is illustrated in Fig. 12 where an internally toothed outer gear member 44A, of required larger pitch diameter, engages the outermost element of the superimposed resilient elements 20, on each hub member. This arrangement at least doubles the torsional resilience, as compared with the coupling of the preceding description, and incidentally provides increased misalignment accommodation. Sealing members 46A and retaining rings 47A, of increased radial depth, enclose the ends of the outer member for the purposes already described for the preceding coupling construction.

Where variably increased degrees of coupling torsional resilience, misalignment accommodation and axial float over a still greater range appear to be necessary, the modification illustrated in Fig. 13 is provided. Here the coupling hub members 42a are spaced axially further apart and preferably provided with arcuate or spherical gear teeth 30B and spherically corrugated axially self-retaining resilient members 20A, of the types illustrated in Fig. 7. An internally toothed annular outer member 44B, of the required increased axial length, interconnects the hubs and resilient members as described for the preceding coupling constructions. This outer member is resiliently centered over the hub members by light conical springs 50, with their smaller conical diameter encircling each hub member at the outer ends of the gear teeth and their larger conical diameter bearing against the internal surface of the sealing members 46A, at each end of the outer member.

Figure 14:
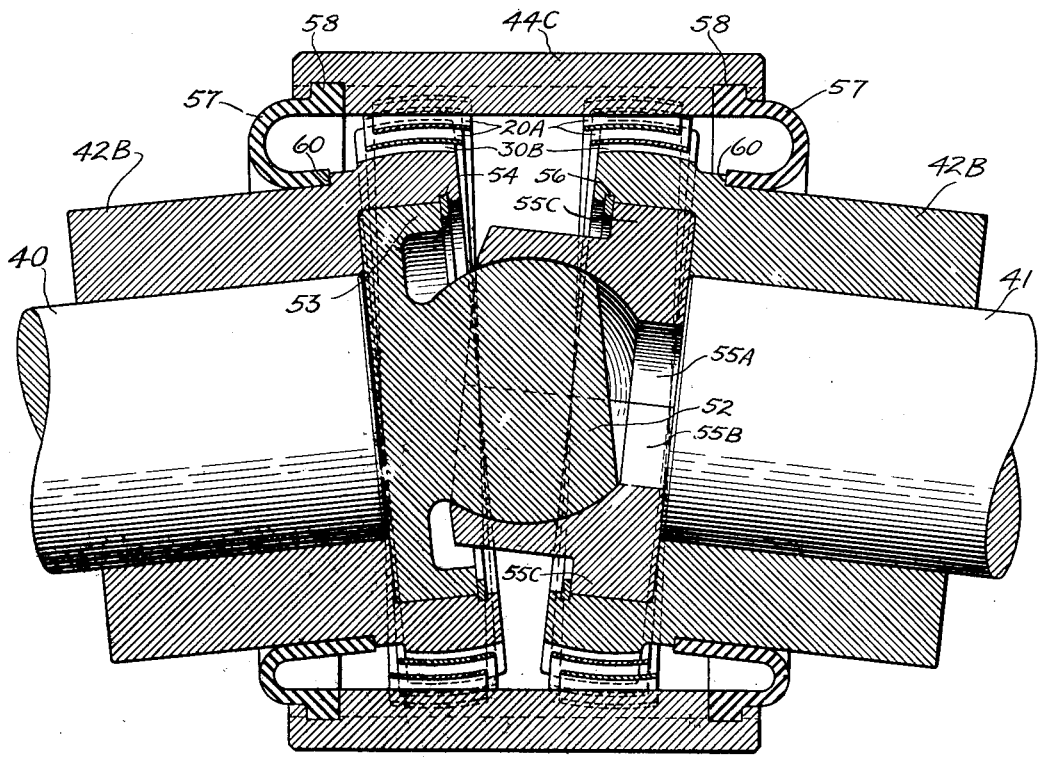
Figure 14 is a sectioned side elevational view of another modification of the coupling embodying shaft supporting and centering means and showing the parts at a relatively large operating angle.

Coupling requirements involving widely varying shaft angles, prolonged periods of operation at relatively large shaft angles, and extended shafts, utilize the modification illustrated in Fig. 14. In this figure, shafts 40 and 41 are shown at their maximum operating angle. Mounted on the shaft ends are identical hub members 42B, with end faces counterbored to receive ball and socket shaft supporting members. The ball member comprises an externally spherical center portion 52 integral with an annular flanged portion 53 of larger diameter. This flanged portion is adapted to seat in the counterbored recess of either hub member and is retained therein by the groove-engaged snap ring 54. The socket member comprises identical internally spherical half portions 55A and 55B, adapted to receive the ball member and provided with integral flange portions 55C seating in the counterbored recess of the opposite hub member and retained by snap ring 56. Each hub member is provided with circumferentially spaced axially disposed spherical gear teeth 30B, and concentric, superimposed spherically corrugated resilient elements 20A, of the types illustrated in Figs. 7 and 13 and earlier described in connection therewith. An internally toothed annular outer member 44C, of sufficient axial length to accommodate the maximum combined angularity of the hub members, interconnects the latter in the manner already described for the equivalent member illustrated in the preceding figures. Flexible annular sealing members 57 enclose each end of this outer member to retain lubricant in the clearance spaces. Each sealing member is provided with an external circumferential rib 58 for engaging a circumferential internal groove at an end of the annular member, and an inner circumferential sleeve portion encircling the hub surface against a retaining shoulder 60, integral therewith. Installed as described these sealing members serve also to resiliently center and retain the outer member over the hub members.

Couplings of the foregoing construction effectively function as constant angular velocity universal joints. Each member of the kinematic chain of rigid and resilient parts is free to rotate in a separate plane. This condition meets the fundamental requirement for constant angular velocity operation with such members and ensures shaft operation without the cyclical speed and torque fluctuations inherent in the classical universal joint construction.

The embodiments of this invention illustrated and described above show that it is adapted to a broad range of resilient drive requirements. A great many simple structural modifications, of which the foregoing examples were typical, can be utilized to obtain various operating characteristics and manufacturing advantages. The advantage of the elliptical gear tooth and corrugation contact, for example, may be realized in another way by utilizing axially straight gear teeth, which are somewhat simpler to manufacture, and providing axially elliptical corrugations in the resilient element. Again, a different order of resilience may be achieved without changing the rigid toothed members by substituting a more closely fitted multiple layer element in a given annular tooth space. Strip and wire resilient elements of the types illustrated and described may be combined in the same coupling structure to obtain other performance characteristics. Gear tooth and corrugation shapes may also be varied to modify the corrugation deflection characteristics.

It will thus be appreciated that numerous such changes may be made in the shape, size, combination and arrangement of the structural members described without departing from the spirit of the invention or the scope of the appended claims.

I claim:

1. A flexible coupling for connecting a driving and a driven member, said coupling comprising an externally toothed gear structure connected to one of said members and having a tooth contact pitch circle, an internally toothed gear structure connected to the other of said members and having a tooth contact pitch circle substantially larger than the pitch circle of the externally toothed gear, the teeth of the gear structures being loosely interfitted to provide a radial clearance space therebetween, and a corrugated elastic element fitted in said clearance space and contacting the sides of the teeth of said toothed structures substantially at the respective pitch circles and being out of contact with said structures at all other points.

2. A flexible coupling for connecting a driving and a driven member, said coupling comprising an externally toothed gear structure connected to one of said members and having a tooth contact pitch circle, an internally toothed gear structure connected to the other of said members and having a tooth contact pitch circle substantially larger than the pitch circle of the externally toothed gear, the teeth of the gear structures being loosely interfitted by the amount of the difference in diameter of said pitch circles to provide a radial clearance space therebetween, and a corrugated elastic element fitted in said radial clearance space and contacting the sides of the teeth of said toothed structures substantially at the respective pitch circles and being out of contact at all other points.

3. A flexible coupling for connecting a driving and a driven member, said coupling comprising an externally toothed gear structure connected to one of said members and having a tooth contact pitch circle, an internally toothed gear structure connected to the other of said members and having a tooth contact pitch circle substantially larger than the pitch circle of the externally toothed gear, the teeth of at least one of the gear structures being rounded to be thicker in the center than at either end, the teeth of the gear structures being loosely interfitted to provide a radial clearance space therebetween, and a corrugated elastic element fitted in said clearance space and contacting the sides of the teeth of said toothed structures substantially at the respective pitch circles and being out of contact with said structures at all other points.

4. A flexible coupling for connecting a driving and a driven member, said coupling comprising an externally spherical toothed gear structure connected to one of said members and having a tooth contact pitch circle, an internally toothed gear structure connected to the other of said members and having a tooth contact pitch circle substantially larger than the pitch circle of the externally toothed gear, the teeth of the gear structures being loosely interfitted to provide a radial clearance space therebetween, and a spherically corrugated elastic element fitted in said radial clearance space and contacting the sides of the teeth of said toothed structures substantially at the respective pitch circles and being out of contact with said structures at all other points.

5. A flexible coupling for connecting a driving and a driven member, said coupling comprising an externally toothed gear structure connected to one of said members, an internally toothed gear structure connected to the other of said members, the teeth of the gear structures being loosely interfitted to provide a clearance space therebetween, and a corrugated elastic element fitted in said clearance space and contacting the sides of the adjacent interfitted teeth along axially disposed and circumferentially and radially spaced contact lines and being out of contact with said structures at all other axial lines.

References Cited in the file of this patent

UNITED STATES PATENTS

| 1,017,819 | Sundh | Feb. 20, 1912 |
| 1,435,141 | Serrell | Nov. 7, 1922 |
| 1,891,969 | Bibby | Dec. 27, 1932 |
| 2,466,218 | Farrell et al. | Apr. 5, 1949 |

FOREIGN PATENTS

| 302,824 | Great Britain | 1928 |
| 643,373 | Germany | 1937 |